United States Patent Office 3,804,842
Patented Apr. 16, 1974

3,804,842
1,1'-CARBONYL-BIS (CARBOXYPIPERIDINES)
Daniel Ashton Dimming, King of Prussia, Pa., assignor to Pennwalt Corporation, Philadelphia, Pa.
No Drawing. Original application Nov. 12, 1969, Ser. No. 876,134, now Patent No. 3,630,999. Divided and this application July 12, 1972, Ser. No. 168,784
Int. Cl. C07d 29/28
U.S. Cl. 260—293.63          3 Claims

ABSTRACT OF THE DISCLOSURE

Difunctional monomers containing a tetrasubstituted urea linkage are prepared and used to prepare condensation polymers having a tetrasubstituted urea group in the polymer chain. The polymers have enhanced thermal stability because degradative reactions involving the urea hydrogen atoms are not possible. The polymers are film forming materials and have high melting points.

This application is a division of Ser. No. 876,134, filed Nov. 12, 1969, now U.S. 3,630,999.

BACKGROUND OF THE INVENTION

Field of the invention

This invention relates to condensation monomers and polymers and more particularly to novel and useful monomers and their corresponding high melting, soluble, linear polymers which are characterized by the presence of a tetrasubstituted urea moiety in their structure. Also included in the field of this invention are processes for the preparation of the monomers containing a tetrasubstituted urea moiety and polymers derived from these monomers.

Description of the prior art

Polymers containing urea moieties in the polymer chain are reported, e.g. U.S. Pat. 3,006,878. These urea moieties are often unsubstituted i.e. have hydrogen atoms on one or both of the urea nitrogen atoms. Urea polymers are generally very high melting materials whose mechanical properties deteriorate when heated. This deterioration is due to undesirable side reactions involving the hydrogen atoms on the urea nitrogen atoms. Unsubstituted ureas are known to yield compounds such as isocyanic acid, cyanurates, isocyanates, and biuret, on heating. Analogous reactions are believed to occur in polymers resulting in embrittlement of the polymer rendering it unfit for use in situations where mechanical stress is applied.

SUMMARY OF THE INVENTION

The tetrasubstituted urea monomers of this invention are dibasic acids or their derivatives, having the following structure:

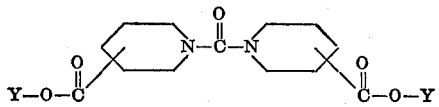

where Y is hydrogen, methyl and ethyl. The monomers of this invention are prepared by the reaction of piperidine compounds having a

group on the piperidine ring with an acid dihalide of carbonic acid, e.g. phosgene. The coupling of two molecules of the piperidine is accomplished by reaction of the piperidine nitrogen atom with the acid dihalide.

The tetrasubstituted urea polymers of this invention have the following structure unit in their polymer chains

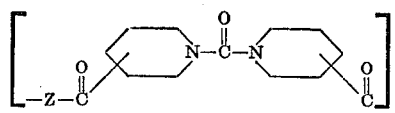

wherein Z is

and X—R—X; wherein X—R—X is a difunctional group derived from either a diamine in which instance the polymer is a poly amide-urea) or from a dihydroxy compound, in which instance the polymer is a poly (ester-urea). These polymers are prepared by conventional condensation polymerization techniques.

DESCRIPTION OF THE PREFERRED EMBODIMENTS

Example I.—Preparation of 1,1'-carbonyl-4,4'-bis (carbethoxypiperidine)

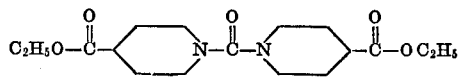

A 250 milliliter round bottom flask, fitted with a stirrer, a gas inlet tube, and a condenser connected to an aqueous caustic trap, was charged with 75 milliliters of benzene and 53.4 grams (0.34 mole) of ethyl isonipecotate. The solution was cooled to 5° C. and, with vigorous stirring, 8.4 grams (0.085 mole) of phosgene gas was fed over a period of one hour with the reaction temperature kept at 5° C. using an ice bath. After standing overnight at room temperature, approximately 25 milliliters of benzene was distilled off. The mixture was cooled to room temperature and filtered to separate the amine hydrochloride salt. The filtrate was distilled and the product, 1,1'-carbonyl-4,4'-bis(carbethoxypiperidine), was collected as a yellow, viscous oil at 180–185° C. at 0.2 milliliter of mercury pressure. Recrystallization from n-hexane gave 20.2 grams (70% conversion) melting point 73–74° C. (uncorr.). The diester urea was insoluble in water and soluble in all common organic solvents with the exception of unbranched, aliphatic hydrocarbons at room temperature.

The infrared spectrum of the product was consistent with the structure and showed an ester carbonyl peak at about 1720 cm.$^{-1}$ and a urea carbonyl peak at about 1625 cm.$^{-1}$.

Eleemntal analyses were as follows: Calc'd (percentage): C, 59.98; H, 8.29; N, 8.23. Found (percent): C, 59.96; H, 8.34; N, 8.25.

Example 2—Preparation of 1,1'-carbonyl-4,4'-bis (carboxypiperidine)

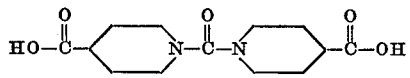

A two-liter Morton flask was charged with 258.4 grams (2.0 moles) of isonipecotic acid, 800 milliliters of methylene chloride, and a solution of 202.0 grams (3.6 moles) of potassium hydroxide in 200 milliliters of water. The resulting suspension was cooled to 5° C. and with efficient stirring, 79.2 grams (0.8 mole) of phosgene gas was fed into the flask over a period of 2 hours. The mixture was allowed to warm to room temperature with a low flow of nitrogen while stirring for an additional one hour.

The product mixture was transferred to a separatory funnel. The methylene chloride phase was separated and discarded. To the aqueous phase was added 250 milliliters of 1% aqueous potassium hydroxide. The aqueous phase was filtered and the filtrate was acidified with concentrated hydrochloric acid to a pH of 4. The mixture was filtered and the white solid was washed twice with 500 milliliter portions of water. The product, 1,1'-carbonyl- 4,4'-bis (carboxypiperidine), 117.1 grams (51.5% conversion based on phosgene). It melted with decomposition at 210–211.5° C. It was soluble in methanol, ethanol, tetrahydrofuran acetone, and pyridine; insoluble in less polar solvents. The infrared spectrum showed a carboxylic acid carbonyl peak at about 1680 cm.$^{-1}$ and a urea carbonyl peak at about 1625 cm.$^{-1}$.

Elemental analyses were as follows: Calc'd (percent): C, 54.92; H, 7.09; N, 9.86. Found (percent): C, 54.75; H, 7.18; N, 9.64.

Example 3—Preparation of 1,1'-carbonyl-3,3'-bis(carboxypiperidine)

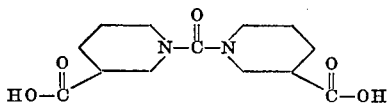

The procedure of Example 2 was followed using nipecotic acid (hexahydronicotinic acid) in place of isonipecotic acid. The product obtained has analytical values consistant with 1,1'-carbonyl-3,3'-bis(carboxypiperidine).

Example 4.—Melt polycondensation of the salt prepared from 1,1' - carbonyl - 4,4'-bis(carboxypiperidine) and 1,3-bis(4'-piperidyl) propane A solution of 2.15 grams (0.0102 mole) of 1,3-bis(4'-piperidyl) propane in 10 milliliters of ethanol was added to a warm solution (approx. 40° C.) of 2.84 grams (0.01 mole) of 1,1'-carbonyl-4,4'-bis(carboxypiperidine) in 30 milliliters of ethanol. The mixture was allowed to stand overnight at room temperature. A white solid was collected by filtration, washed with cold ethanol and air-dried overnight to give 3.15 grams of the amine salt. The salt melted with decomposition at about 235° C.

A Pyrex polymer tube was charged with 2.98 grams of the above amine salt. The tube was sealed under vacuum and heated at 180° C. for 3½ hours. The tube was then opened and heated at 260° C. for one hour with a nitrogen purge followed by an additional 2½ hours at 260° C. under vacuum. The resulting poly(amide/urea) had a stick point (Kofler) of approximately 235° C. It gave a transparent, tough film cast from formic acid. The polymer had an inherent viscosity of 1.30 dl./g. (0.5 gram of polymer in 100 milliliters of m-cresol at 30° C.).

Example 5.—Melt polycondensation of 1,1'-carbonyl-4,4'-bis(carbethoxypiperidine) and ethylene glycol A glass polymer tube was charged with 10.21 grams (0.03 mole) of 1,1'-carbonyl-4,4'-bis(carbethoxypiperdine) and 4.10 grams (0.066 mole) of ethylene glycol. Tetraisopropyl titanate (0.025 ml. was added as a catalyst. The tube was heated in a 197° C. vapor bath with a feed of $N_2$ through the melt for 3 hours. The tube was transferred to a 222° C. bath for 30 minutes and finally to a 260° C. bath for 2 hours at reduced pressure. The polymeric product obtained from the reaction was quite stiff and non-fiber-forming. It was soluble in methylene chloride, chloroform, m-cresol and dimethylformamide; swelled by methyl alcohol and acetone; and was insoluble in hexane and ethyl ether.

The nomenclature system, as presented in Chemical Abstracts, volume 56 (1962) indicates that the piperidine ring positions should be numbered as follows:

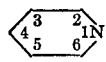

This numbering is followed in naming the compounds of this invention. Also, whenever reference is made to substituents on a piperidine ring of these compounds, this numbering system is followed.

The preparation of monomers having a tetrasubstituted urea moiety in their structure is accomplished by reaction of the appropriate piperidine compound with the diacid halide of carbonic acid e.g., phosgene;

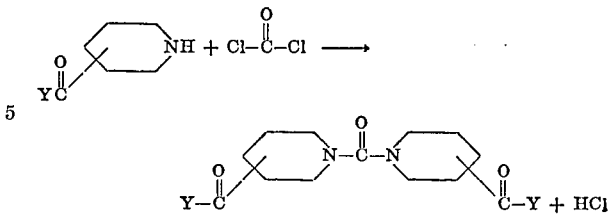

The reaction is preferably carried out in an inert solvent e.g. benzene, carbon tetrachloride, methylene chloride, ether, and the like. Hydrogen chloride, which is generated in this reaction, reacts with the piperidine starting material to form a salt. Accordingly an excess of the piperidine must be used or a base must be added to react with the hydrogen chloride. Inorganic acid acceptors e.g. sodium hydroxide, calcium hydroxide, calcium oxide, sodium carbonate are especially suitable for reaction with the generated hydrogen chloride.

The phosgenation reaction to form the monomers of this invention may be carried out at any convenient temperature. However, better yields of monomer and better control of the reaction result when the reaction mixture is maintained at a low temperature, i.e. 0° to 5° C. The monomers are obtained from their reaction mixtures by conventional methods, e.g. distillation, crystallization and precipitation.

The polymers of the invention are prepared by condensing the carboxylic acid derivatives of 1,1'-carbonyl-bis piperidine with a diamine or dihydroxy compound. The carboxylic acid functionality may be on the 2, 3, or 4-position of the piperidine ring. Usually the urea is symmetrical i.e. both piperidine rings have their carboxylic acid group on the same position but this is not essential. One advantage of this invention resides in the ease with which monomers having a variety of structures can be prepared. Thus, by reacting a mixture of two different piperidine carboxylic acid starting materials with phosgene, a mixture of three different monomers is obtained. The usual practice is, however, to begin with a single piperidine carboxylic acid derivative and obtain a single product, e.g. ethyl isonipecotate, yields 1,1'-carbonyl-4,4'-bis(carbethoxypiperidine) wherein the carboxyethyl group is on the 4 position of the two piperidine rings.

The tetrasubstituted urea derivatives are condensed through their carboxylic acid functionality with diamines or dihydroxy compounds to form condensation polymers. The diamines lead to polymers which are polyamides while the dihydroxy compounds lead to polyesters. Examples of diamines which lead to the amides of this invention are: hexamethylene diamine, pentamethylenediamine, piperazine, meta and para-phenylenediamine, 2,2-bis(4-aminophenyl) propane, 1,3-diaminocyclohexane, 1,4-diaminocyclohexane, 1,3-bis(4'-piperidyl) propane and the like.

Where diamines, such as piperazine and 1,3-bis(4'-piperidyl) propane are used to prepare a polymer, a novel structure results. No amine hydrogen atoms are present in the polymer and, accordingly, degradation due to reactions involving amide hydrogen cannot occur.

Illustrative dihydroxy compounds which are used to prepare the polyesters are: ethylene glycol, trimethylene glycol, 2,2-bis(4-hydroxyphenyl) propane, 1,3-dihydroxy cyclohexane, 1,4-bis(hydroxymethyl) cyclohexane and the like.

The polymers of this invention may be prepared by the conventional methods employed for condensation polymers e.g. interfacial polymerization, ester exchange etc. Those skilled in the art are aware that the polyamides and polyesters are prepared by different techniques.

The polymers of this invention can be cast into films or dry spun into filament form from solutions containing 10 to 30% by weight of the polymer. The solubility of the polyamides and polyesters of this invention, in solvents, will vary but in general, solvents such as formic acid, dimethylformamide and meta-cresol are useful solvents for these polymers.

What is claimed is:

1. A difunctional tetrasubstituted urea having the structure

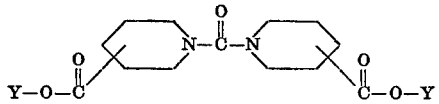

wherein Y is selected from the group consisting of hydrogen, methyl and ethyl.

2. A compound of claim 1 wherein each piperidine ring has a

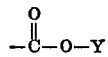

(carboxyl functional) group on the 3 position.

3. A compound of claim 1 wherein each piperidine ring has a

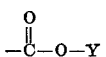

(carboxyl functional) group on the 4 position.

References Cited

UNITED STATES PATENTS 3,210,359  10/1965  Cislak et al. _____ 260—293.63
3,341,583  9/1967  Anderson et al. ___ 260—293.63

OTHER REFERENCES

Agricultural & Food Chemistry 7: 265–266 (1959), Krewson et al.

HENRY R. JILES, Primary Examiner
S. D. WINTERS, Assistant Examiner